United States Patent [19]

Skarnells

[11] 4,408,411

[45] Oct. 11, 1983

[54] FISHING LURE RETRIEVER

[76] Inventor: David B. Skarnells, 5925 Samuel St., La Mesa, Calif. 92041

[21] Appl. No.: 265,727

[22] Filed: May 21, 1981

[51] Int. Cl.³ .............................................. A01K 97/00
[52] U.S. Cl. ..................................... 43/17.2; 43/44.9
[58] Field of Search ............................ 43/17.2, 44.9; 294/66 R, 86 R, 86 CG

[56] References Cited

U.S. PATENT DOCUMENTS

| | | | |
|---|---|---|---|
| 2,482,037 | 9/1949 | Swaim | 43/17.2 |
| 2,809,460 | 10/1957 | Taylor | 43/17.2 |
| 3,191,335 | 6/1965 | Sobetzer | 43/17.2 |
| 3,224,132 | 12/1965 | Frantz | 43/17.2 |
| 3,404,482 | 10/1968 | Maske | 43/17.2 |

Primary Examiner—Nicholas P. Godici
Assistant Examiner—Charles L. Willis
Attorney, Agent, or Firm—Charmasson & Holz

[57] ABSTRACT

A fishing lure retriever is provided having a body portion from which depend a plurality of lengths of chain which are captured in the body of the device by a unique structure, the nature of the chains being inherently such that they tend not to tangle or engage structure other than the hooks of a fishing lure.

4 Claims, 8 Drawing Figures

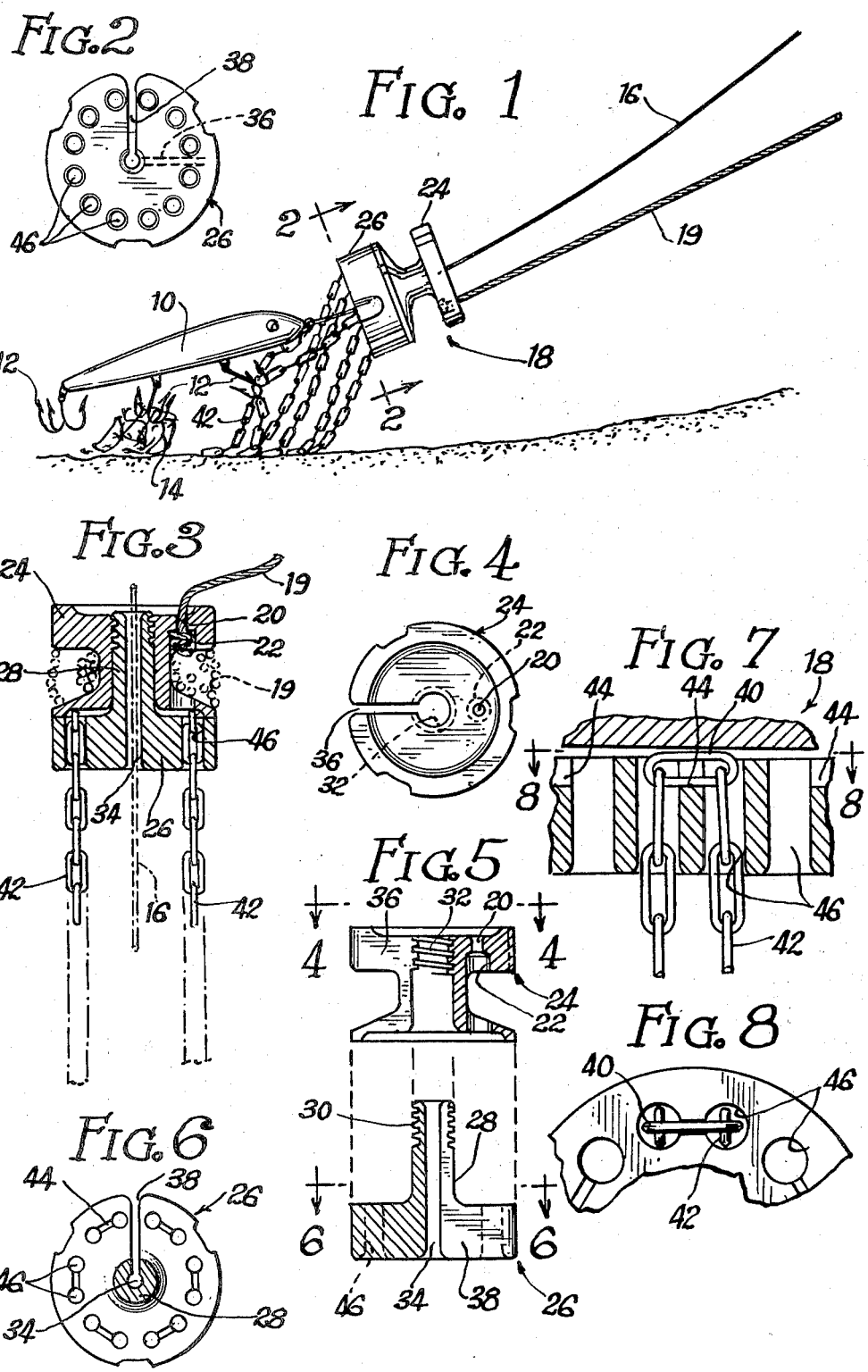

FISHING LURE RETRIEVER

BACKGROUND OF THE INVENTION

Anyone who has ever fished, unless it was strictly surface fishing, will be aware of the problem of snagged hooks and lures. Even a snagged hook can be annoying, as lead is rather expensive and the sinker often remains with the hook when the line separates, and aside from the cost factor, the re-fixing of the line is time consuming and tedious, and distracts from the joy of fishing.

When lures are used, the monetary aspects of the problem are considerably magnified. The cost of sophisticated lures is quite considerable.

In the past, lure retrievers have been developed which slide down the line and one way or another capture the lure. Some of these devices surround and grip the body of the lure, and others have hooks or other structure which engage the hooks of the lure. Some also may engage the fishing line close to the lure, although this type, of course, only insures that the bulk of the line will be retrieved.

One problem with lure retrievers is that those that are effective generally engage the hooks of the lure rather than trying to engage the body. Those that engage the hooks generally use other hooks, or grappling structure which is equally likely to engage rocks, seaweed, bottom growth or other structure or debris as to engage the hooks of the lure. This can result at the very least in failure to retrieve the lure, and at worst, losing the lure retriever in addition to the lure.

There is an need for an effective lure retriever which can engage the hooks of a lure, but which is structured to avoid the possibility of engaging other bottom debris instead.

SUMMARY OF THE INVENTION

The present invention fulfills the above stated need by providing a lure retriever with a two-part body, one part of which comprises a spool and the other part a base member with a central spindle which extends up through the spool, there also being a plurality of chains which loop up, around and down the base member through special holes cut longitudinally in the base. The spool portion of the base is screwed down to firmly engage and retain central links of the chain loops, and the dangling ends will serve to engage the hooks.

The top, spool portion of the body of the device serves not only as a retainer to seize the central links of the chains, but also acts as a spool to wind the retrieving line when not in use.

BRIEF DESCRIPTION OF THE DRAWINGS

FIG. 1 is a side elevation view of the retriever in use;

FIG. 2 is a section taken along line 2—2 of FIG. 1 without the chains;

FIG. 3 is a longitudinal sectional view taken through the device;

FIG. 4 is a top elevation view of the spool portion as shown in FIG. 5;

FIG. 5 is an exploded longitudinal sectional view of the spool and base portions of the body;

FIG. 6 is a section taken along line 6—6 of FIG. 5;

FIG. 7 is a detailed section taken through the chain mounting passageway;

FIG. 8 is a section taken along line 8—8 of FIG. 7.

DETAILED DESCRIPTION OF THE DRAWINGS

As shown in FIG. 1, a lure 10 is characteristically snagged by one of its trident hooks 12 in some bottom brush 14 to the extent that further tugging on the fish line 16 would result in the separation of the line and loss of the lure. The bottoms of some fishing spots must be so covered with lures that the fish are rather used to them and are inclined not to bite on other lures.

The retrieving includes a body portion 18 through which a retrieving line 19 is engaged by virtue of an orifice 20 opening into a socket 22 to engage a knot in the end of the retriever line. The body is comprised of two parts, a spool section 24 and a base member 26, the latter of which has a central spindle 28 threaded as at 30 to engage mating threads 32 in the interior of the spool. The base with its central spindle defines a continuous bore 34 through which the fish line may be entwined by passing it through the cutaway slots or sectors 36 and 38 in the spool and base, respectively. Since these slots rotate relative to one another, there is only one orientation at which they coincide and the line passes through into the bore 34. At other times, the mis-align as shown in FIG. 2, capturing the line inside the bore until the two parts are again reverse-rotated.

When not in use, extra lengths of the retriever line 19 are wrapped around the spool 24 as shown in FIG. 3. An additional function of the spool is to capture the central links 40 of the chains 42 in seats 44, each of which connects a pair of passageways 46 which pass longitudinally through the body, permitting a single length of chain to pass up, across and down through passageways 46, as shown in FIG. 7, with the central links 40 seated in the seats 44. As indicated above, tightening down the spool captures the central links effectively as best shown in FIG. 7, positively preventing their separation from the body. The passageway pairs are shown as being angularly sequenced but they could also be radially oriented, or arranged at an angle to radial.

The chains, depending as they do from the bottom portion of the body, will tend to engage the trident hooks 12 of the lure 10 as shown in FIG. 1, to establish a firm connection for retrieving the lure. The lure can either be over powered with the stronger line 19 connected to the body of the retriever, or it can be jiggled, wiggled, pulled at different angles and otherwise teased loose.

In any event, by virtue of the inherent closed nature of chain links, unlike hooks or other grappling structure the chains will not tend to become snagged or lodged on ground matter or debris. Additionally, loss of one chain by breakage is easily remedied by replacing the entire chain at very low expense. Although ordinarily the lure would part from the rock, or the hook or the hook would part from the lure, before the chain would break, if this does happen it is no great loss. Additionally, the chains are removeable for routine cleaning and maintenance by the simple expedient of counter rotating the spool portion of the body.

Thus the device as disclosed and claimed herein represents a simple, easily deployed snag proof lure retriever which should save hundreds of lures for the average fisherman throughout the duration of his fishing career.

While I have described the preferred embodiment of the invention, other embodiments may be devised and different uses may be achieved without departing from the spirit and scope of the appended claims.

What is claimed is:

1. A lure retriever comprising:

a body;

means on said body to engage a fishing line in sliding relation;

an attachment point for a cord;

a plurality of chains depending from said body to ensnare the hooks of a lure on the end of said fishing line, said chains being releasably mounted to said body to permit cleaning and replacement of same; wherein said body comprises a base with coaxial threads and a spool engageable on said threads and being axially advanceable thereon toward said base; and said base has therethrough passageway pairs for passing chain loops and defines a link seat between each passageway pair such that tightening said spool down captures any link seated in said link seat to define a pair of depending chains passing through said passageways.

2. Structure according to claim 1 wherein said spool defines an aperture therethrough for a knotted cord and provides an annular space for coiling said cord on same.

3. Structure according to claim 1 wherein said spool and base each have central coaxial bores communicating radially through said body by void sections defined respectively through said base and said spool such as to be alternately aligned and mis-aligned by mutual rotation to alternately permit and prohibit passage of a fishing line into and out of said bores.

4. Structure according to claim 3 wherein said base includes a central, bored spindle extending upwardly from the upper part of said base through the upper part of said spool, and said bore through said base passes completely through said spindle.

* * * * *